United States Patent
Dengler et al.

(10) Patent No.: US 12,280,645 B2
(45) Date of Patent: Apr. 22, 2025

(54) DRIVE ASSEMBLY AND VEHICLE HAVING SUCH A DRIVE ASSEMBLY

(71) Applicant: Robert Bosch GmbH, Stuttgart (DE)

(72) Inventors: Peter Dengler, Stuttgart (DE); Robert Hecht, Korb (DE)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 17/980,608

(22) Filed: Nov. 4, 2022

(65) Prior Publication Data

US 2023/0138771 A1 May 4, 2023

(30) Foreign Application Priority Data

Nov. 4, 2021 (DE) .......................... 102021212420.8

(51) Int. Cl.
| | |
|---|---|
| *B60K 1/02* | (2006.01) |
| *F16H 3/00* | (2006.01) |
| *F16H 3/093* | (2006.01) |

(52) U.S. Cl.
CPC .............. *B60K 1/02* (2013.01); *F16H 3/006* (2013.01); *F16H 3/093* (2013.01); *F16H 2003/008* (2013.01); *F16H 2003/0938* (2013.01)

(58) Field of Classification Search
CPC . B60K 1/02; B60K 1/00; B60K 17/02; B60K 17/08; F16H 3/006; F16H 3/093;
(Continued)

(56) References Cited

U.S. PATENT DOCUMENTS

| | | | |
|---|---|---|---|
| 8,512,187 B2* | 8/2013 | Puiu | B60W 20/30 |
| | | | 475/5 |
| 8,657,712 B2* | 2/2014 | Tamai | F16H 3/728 |
| | | | 475/5 |

(Continued)

FOREIGN PATENT DOCUMENTS

| | | | | |
|---|---|---|---|---|
| DE | 102018210897 A1 * | 1/2020 | ............... | B60K 1/00 |
| DE | 102020115666 A1 * | 12/2021 | ............. | F16H 3/006 |

(Continued)

OTHER PUBLICATIONS

DE-102020115666-A1 English Translation (Year: 2021).*
(Continued)

*Primary Examiner* — James A Shriver, II
*Assistant Examiner* — Michael T. Walsh
(74) *Attorney, Agent, or Firm* — Michael Best & Friedrich LLP

(57) ABSTRACT

A drive assembly (10) comprising a first electric machine (12) having a first drive shaft (14), a second electric machine (16) having a second drive shaft (18), an output shaft (20), wherein the first drive shaft (14) and the second drive shaft (18) are coupled or couplable to the output shaft (20) in such a way that the output shaft (20) can be driven by the first drive shaft (14) and/or the second drive shaft (18), wherein the second drive shaft (18) comprises a first one-way clutch (22) by which the second drive shaft (18) is coupled or couplable to the output shaft (20) and a second one-way clutch (24), wherein the first one-way clutch (22) and the second one-way clutch (24) are configured so as to act in opposite directions of rotation, wherein, by the second one-way clutch (24) and an intermediate gearwheel (27), the second drive shaft (18) is coupled or couplable to the output shaft (20).

19 Claims, 1 Drawing Sheet

(58) Field of Classification Search
CPC ....... F16H 2003/008; F16H 2003/0938; F16H 3/003; F16H 3/089; F16H 2200/0021; F16H 2200/0034; B60Y 2200/91; B60Y 2400/427; Y02T 10/62
See application file for complete search history.

(56) References Cited

U.S. PATENT DOCUMENTS

| | | | |
|---|---|---|---|
| 8,727,939 B2 * | 5/2014 | Chen | B60L 50/16 |
| | | | 74/329 |
| 8,931,371 B2 * | 1/2015 | Xie | B60K 6/48 |
| | | | 903/909 |
| 10,576,816 B2 * | 3/2020 | Eo | B60K 6/383 |
| 11,091,018 B2 * | 8/2021 | Ore | F16H 37/0826 |
| 11,325,459 B2 * | 5/2022 | Ore | F16H 37/084 |
| 11,396,231 B2 * | 7/2022 | Burjes | B60K 17/28 |
| 11,913,528 B1 * | 2/2024 | Neumann | F16H 37/086 |
| 2014/0213410 A1 * | 7/2014 | Mori | B60W 10/02 |
| | | | 180/65.265 |

FOREIGN PATENT DOCUMENTS

| | | | | |
|---|---|---|---|---|
| EP | 1199468 A2 * | 4/2002 | | B60K 6/26 |
| WO | WO-2020025775 A1 * | 2/2020 | | B60K 1/02 |

OTHER PUBLICATIONS

EP-1199468-A2 English Translation (Year: 2002).*
DE-102018210897-A1 English Translation (Year: 2020).*
WO-2020025775-A1 English Translation (Year: 2020).*

* cited by examiner

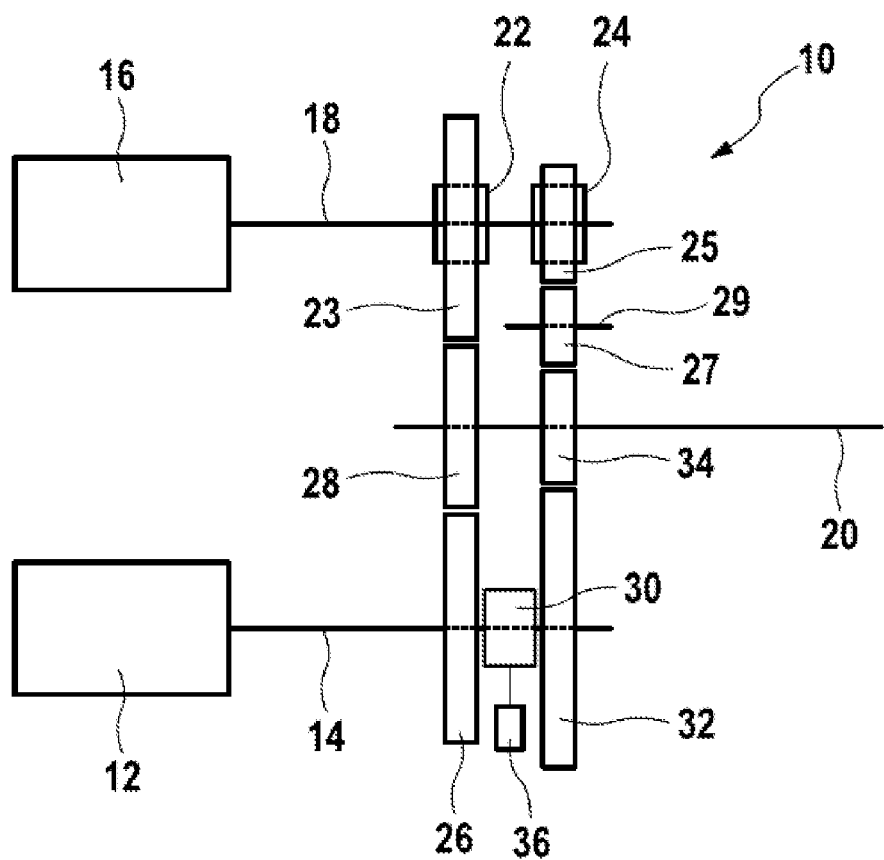

DRIVE ASSEMBLY AND VEHICLE HAVING SUCH A DRIVE ASSEMBLY

BACKGROUND OF THE INVENTION

The invention relates to a drive assembly, in particular for a vehicle, comprising a first electric machine having a first drive shaft, a second electric machine having a second drive shaft, an output shaft, wherein the first drive shaft, the second drive shaft, and the output shaft are in particular arranged parallel to one another, wherein the first drive shaft and the second drive shaft are coupled or couplable to the output shaft in such a way that the output shaft can be driven by means of the first drive shaft and/or the second drive shaft. The invention also relates to a vehicle having such a drive assembly.

In order to implement a plurality of gears on an electric drive, two electric machines can be connected to a common transmission. Within the transmission, the torque of both electric machines can be summed on a common output shaft.

DE 10 2018 210 897 A1 discloses a drive assembly of an electric vehicle comprising two electric machines for driving a vehicle axle and a transmission arranged between the electric machines and the vehicle axle. The transmission comprises a plurality of countershafts and a plurality of gearwheels. Due to this arrangement, switching can be performed between a total of three gears with the transmission (summation transmission).

SUMMARY OF THE INVENTION

According to the present invention, a drive assembly, in particular for a vehicle, is proposed, comprising a first electric machine having a first drive shaft, a second electric machine having a second drive shaft, and an output shaft. The first drive shaft, the second drive shaft, and the output shaft can optionally be arranged parallel to one another.

The first drive shaft and the second drive shaft are coupled or couplable to the output shaft in such a way that the output shaft can be driven by means of the first drive shaft or first electric machine and/or the second drive shaft or second electric machine, respectively.

The second drive shaft comprises a first one-way clutch (first freewheel). By means of the first one-way clutch, the second drive shaft can be coupled or couplable to the output shaft.

The second drive shaft further comprises a second one-way clutch (second freewheel). The drive assembly further comprises an intermediate gearwheel. The intermediate gearwheel serves in particular to reverse the direction of rotation. It is similarly conceivable that the drive assembly comprises a plurality of intermediate gears, which in particular serve to reverse the direction of rotation. The intermediate gearwheel can be mounted between the second drive shaft and the output shaft, e.g., on an intermediate shaft. By means of the second one-way clutch and the intermediate gearwheel, the second drive shaft can be coupled or couplable to the output shaft.

The first one-way clutch and the second one-way clutch are configured so as to act in opposite directions of rotation. In other words, the second drive shaft can be coupled to the output shaft in both directions of rotation. The first one-way clutch and the second one-way clutch have opposite driving directions, in particular. Depending on the direction of rotation in which the second electric machine is driven, either the first one-way clutch (second one-way clutch is then freewheeling) or the second one-way clutch (first one-way clutch is then freewheeling) engages.

Such a configuration has the advantage, among other things, that a high wheel torque can be achieved over a large range of speeds through the use of two electric machines. An uninterrupted switching can also be implemented. A high efficiency in the partial-load range and a summation of power (or torque) of the two electrical machines in the high-load range can be achieved.

By using the first and/or the second one-way clutch, the second drive shaft can be coupled to the output shaft without an adjustment of the speeds between the second drive shaft and the output shaft (transmission synchronization). This can conserve transmission elements and sensors. By simplifying the transmission structure, manufacturing and maintenance costs can be reduced.

By means of a simple reversal of the direction of rotation, a first gear ratio step (via the first one-way clutch) or a second gear ratio step (via the second one-way clutch) can be controlled optionally by means of the second electric machine.

In this case, a torque transfer to the output shaft in each gear ratio step (in each gear) takes place, in particular only when an output speed of the output shaft (speed indication) is reached, because in this state the clutch elements of the corresponding one-way clutch are blocked.

As already indicated, it is possible to implement different gear ratio steps (and thus higher output torques) and activate the output by reversing the direction of rotation of the second electric machine. The high dynamics of the second electric machine as well as its ability to be operated in both directions of rotation can be utilized. Thus, a transmission functionality can be implemented that would otherwise only be possible through expensive and complex switching mechanisms.

For example, the drive assembly can be configured as an electrical axle (E-axle) or form part of an E-axle. For example, the drive assembly can be configured as a transmission or form part of a transmission.

According to a further development, the first drive shaft can comprise a first gearwheel. A second gearwheel can be arranged on the output shaft in a rotationally fixed manner. The first gearwheel can also be configured as a first pinion. The second gearwheel can be driven in particular by the first gearwheel or pinion (gearwheels in meshing engagement). The first gearwheel can be coupled to the first drive shaft in a rotationally fixed manner by means of a clutch (gear adjuster). A first gear of the drive assembly can be implemented in that the first gearwheel of the first drive shaft drives the second gearwheel of the output shaft. In the first gear, the first gearwheel can be coupled to the first drive shaft in a rotationally fixed manner by means of the clutch.

According to a further development, in the first gear of the drive assembly, the second electric machine can be activated in that the second electric machine drives the second gear of the output shaft via the first one-way clutch of the second drive shaft. The output shaft is thus (simultaneously) driven by both electric machines or by the two drive shafts in the first gear. This method of propulsion can be considered a first summation gear. Here, both drive shafts rotate in the same direction of rotation, in particular. In other words, the directions of rotation of the first and second drive shafts and the first and second electric machines, respectively, are concordant in the first gear, in particular.

Alternatively, in the first gear of the drive assembly, the second electric machine can be activated in that the second electric machine drives a fourth gearwheel arranged on the output shaft in a rotationally fixed manner via the second one-way clutch of the second drive shaft via an intermediate gearwheel. The output shaft is thus also (simultaneously) driven by both electric machines or by the two drive shafts in the first gear. This method of propulsion can be considered a second summation gear. Here, both drive shafts rotate in opposite directions, in particular. In other words, the directions of rotation of the first and second drive shafts and the first and second electric machines, respectively, are counter-rotational in the first gear, in particular.

The first one-way clutch can be coupled to a first clutch gearwheel such that the first one-way gearwheel can be coupled to the second drive shaft in a rotationally fixed manner by means of the first one-way clutch. The first clutch gearwheel can be in meshing engagement with the second gearwheel. Alternatively, a keying can be provided on the outer ring of the first one-way clutch, wherein the outer ring of the first one-way clutch can be in meshing engagement with the second gearwheel.

According to a further development, the first drive shaft can comprise a third gearwheel. A fourth gearwheel can be arranged on the output shaft in a rotationally fixed manner. The third gearwheel can be coupled to the first drive shaft in a rotationally fixed manner by means of the clutch (gear adjuster). A second gear of the drive assembly can be implemented in that the third gearwheel of the first drive shaft drives the fourth gearwheel of the output shaft. In the second gear, the third gearwheel can be coupled to the first drive shaft in a rotationally fixed manner by means of the clutch. The third gearwheel can be configured as a second pinion. The fourth gearwheel can be driven in particular by the third gearwheel or the second pinion (gearwheels in meshing engagement).

According to a further development, in the second gear of the drive assembly, the second electric machine can be activated in that the second gear of the output shaft drives the fourth gearwheel of the drive shaft via the second one-way clutch of the second drive shaft and the intermediate gearwheel. The output shaft is thus (simultaneously) driven by both electric machines or by the two drive shafts in the second gear. This method of propulsion can be considered a third summation gear. In particular, the two drive shafts rotate in different directions of rotation. In other words, the directions of rotation of the first and second drive shafts and the first and second electric machines, respectively, are counter-rotational in the second gear, in particular.

Alternatively, in the second gear of the drive assembly, the second electric machine can be activated in that the second electric machine drives the second gear of the output shaft via the first one-way clutch of the second drive shaft. The output shaft is thus also (simultaneously) driven by both electric machines or by the two drive shafts in the second gear. This method of propulsion can be considered a fourth summation gear. Here, both drive shafts rotate in the same direction of rotation, in particular. In other words, the directions of rotation of the first and second drive shafts and the first and second electric machines, respectively, are concordant in the first gear, in particular.

The second one-way clutch can be coupled to a second clutch gearwheel such that the second one-way gearwheel can be coupled to the second drive shaft in a rotationally fixed manner by means of the second one-way clutch. The second clutch gearwheel can be in meshing engagement with the intermediate gearwheel. The intermediate gearwheel can be in meshing engagement with the fourth gearwheel. Alternatively, a keying can be provided on the outer ring of the second one-way clutch, wherein the outer ring of the second one-way clutch can be in meshing engagement with the intermediate gearwheel and the latter with the fourth gearwheel.

In accordance with a further development, a neutral gear of the drive assembly can be implemented in that the first gearwheel and the third gearwheel are freely rotatable on the first drive shaft. The clutch (gear adjuster) is in the neutral (idling) setting, in particular. In the neutral setting, the output shaft is not driven by the first electric machine, even when the first electric machine rotationally drives the first drive shaft. In the neutral gear (neutral setting), the clutch does not couple the first gearwheel or the third gearwheel to the first drive shaft in a rotationally fixed manner. In other words, the first gearwheel and the third gearwheel can rotate freely on the first drive shaft. The first and third gearwheels do not transfer any torque to the output shaft.

According to a further development, the drive assembly can comprise a gear adjuster, which actuates the clutch so that a switching (selection) can be performed between the first, the second, and the neutral gear. The gear selection can thus occur via the gear adjuster.

The gear adjuster can be configured as an actuator. The clutch can comprise a clutch sleeve. The gear adjuster can be configured as an actuator of the clutch sleeve so that the clutch sleeve can be moved by means of the gear adjuster and can thus be selected between gears (switching).

According to a further development, the second electric machine can be deactivatable or activatable in the first, second, and neutral gears. By allowing the second electric machine to be deactivated, the first electric machine can be subjected to a higher load and operated at a better efficiency. In doing so, a higher efficiency of the drive assembly (or drive) can be achieved. Thus, a longer distance can be achieved, in particular in case of electric vehicles.

According to a further development, the drive assembly can be configured so as to provide or switch between eight gears or switching steps. The eight gears comprise in particular four gears in which only the first electric machine or the second electric machine drive or can drive the output shaft, as well as four further gears (summation gears) in which the first electric machine and the second electric machine drive or can drive the output shaft together. The individual gears or switching steps are explained below in the FIGURE description.

The second electric machine can be configured so as to take over the load of the first electric machine during a gear shift. This allows for interruption-free switching.

According to a further development, the first electric machine can be configured for recuperation (energy recovery). Thus, energy can be recovered, for example, during a braking operation of a vehicle with the drive assembly.

Likewise, a reverse mode of the drive assembly can be implemented by means of the first electric machine. Here, the first gearwheel or the third gearwheel can be coupled to the first drive shaft in a rotationally fixed manner by means of the clutch (gear adjuster). The reverse mode can be implemented in that the first electric machine is driven counter to its actual direction of rotation (forward drive, for example, in first or second gear). When the first gearwheel is coupled to the first drive shaft in a rotationally fixed manner, the output shaft can be driven in reverse via the second gearwheel of the output shaft. When the third gearwheel is coupled to the first drive shaft in a rotationally fixed manner, the output shaft can be driven in reverse via the fourth gearwheel of the output shaft.

According to the invention, a vehicle, in particular a motor vehicle, is proposed having a drive assembly according to the above embodiments. With respect to the advantages that can be achieved in this way, reference is made to the explanations regarding the drive assembly. The measures described and/or discussed below in connection with the drive assembly can serve the further design of the vehicle.

BRIEF DESCRIPTION OF THE DRAWINGS

An embodiment of the invention is explained below with reference to the accompanying drawing. The following can be seen:

FIG. 1 is a schematic view of a drive assembly.

DETAILED DESCRIPTION

In FIG. 1, the drive assembly bears the overall reference numeral 10. The drive assembly 10 comprises a first electric machine 12 having a first drive shaft 14. The drive assembly 10 further comprises a second electric machine 16 having a second drive shaft 18. The drive assembly 10 also comprises an output shaft 20.

The first drive shaft 14 and/or the second drive shaft 18 can be coupled to the output shaft 20. For this purpose, the second drive shaft 18 comprises a first one-way clutch 22. In the present case, the first one-way clutch 22 is coupled to a first clutch gearwheel 23. The first clutch gearwheel 23 can be coupled to the second drive shaft 18 in a rotationally fixed manner by means of the first one-way clutch 22, such that the second drive shaft 18 can rotationally drive the first clutch gearwheel 23.

The second drive shaft 18 also comprises a second one-way clutch 24. In the present case, the second one-way clutch 24 is coupled to a second clutch gearwheel 25. The second clutch gearwheel 25 can be coupled to the second drive shaft 18 in a rotationally fixed manner by means of the second one-way clutch 24, such that the second drive shaft 18 can rotationally drive the second clutch gearwheel 25.

The drive assembly 10 further comprises an intermediate gearwheel 27. This serves to reverse the direction of rotation. In the example, the intermediate gearwheel 27 is arranged on an intermediate shaft 29. In the present case, the intermediate shaft 29, the two drive shafts 14, 18, and the output shaft 20 are arranged parallel to one another.

The first drive shaft 14 comprises a first gearwheel 26 and a third gearwheel 32. The first gearwheel 26 and the third gearwheel 32 can optionally be coupled to the first drive shaft 14 in a rotationally fixed manner by means of a clutch 30. The clutch 30 can be actuated (moved) by means of a gear adjuster 36.

A second gearwheel 28 and a fourth gearwheel 34 are arranged on the output shaft 20 in a rotationally fixed manner.

In a first gear, the first gearwheel 26 is driven by the first drive shaft 14 of the first electric machine 12. The first gearwheel 26 meshes with the second gearwheel 28 of the output shaft 20. In the first gear, the first gearwheel 26 is coupled to the first drive shaft 14 in a rotationally fixed manner by means of the clutch 30.

To do so, in the first gear, the second electric machine 16 can be switched. For this purpose, the second electric machine 16 is powered such that the second drive shaft 18 is accelerated (driving in a first direction of rotation). At a speed that is predetermined and dependent on the first one-way clutch 22 (i.e., when the second drive shaft 18 overtakes the first one-way clutch 22), the first one-way clutch 22 couples the first clutch gearwheel 23 to the second drive shaft 18 so that the second drive shaft 18 drives the first clutch gearwheel 23.

Because the first gearwheel 26 as well as the first clutch gearwheel 23 are engaged with the second gearwheel 28 of the output shaft 20 in a meshing manner, the torques of the first drive shaft 14 and the second drive shaft 18 or the first electric machine 12 and the second electric machine 18, respectively, are transferred to or summed on the output shaft 20 via the second gearwheel 28 (first summation gear). The first electric machine 12 and the second electric machine 16 are each driven in the same direction of rotation (concordant rotational movement).

In the first gear, the second electric machine 16 can also be activated in an alternative manner. For this purpose, the second electric machine 16 is powered such that the second drive shaft 18 is accelerated (driving in a second direction of rotation opposite to the first direction of rotation). At a speed that is predetermined and dependent on the second one-way clutch 24 (i.e., when the second drive shaft 18 overtakes the second one-way clutch 24), the second one-way clutch 24 couples the second clutch gearwheel 25 to the second drive shaft 18 so that the second drive shaft 18 drives the second clutch gearwheel 25, and the latter in turn drives the intermediate gearwheel 27. Because the first gearwheel 26 as well as the second gearwheel 28 of the output shaft 20 and the second clutch gearwheel 25 are engaged with the fourth gearwheel 34 of the output shaft 20 in a meshing manner via the intermediate gearwheel 27, the torques of the first drive shaft 14 and the second drive shaft 18 are transferred to or summed on the output shaft 20 via the second gearwheel 28 and the fourth gearwheel 34 (second summation gear). The first electric machine 12 and the second electric machine 16 are driven in opposite directions of rotation (counter-rotational movement).

In a second gear, the third gearwheel 32 is driven by the first drive shaft 14 of the first electric machine 12. The third gearwheel 32 meshes with the fourth gearwheel 34 of the output shaft 20. In the second gear, the third gearwheel 32 is coupled to the first drive shaft 14 in a rotationally fixed manner by means of the clutch 30.

To do so, the second electric machine 16 can also be switched in the second gear. For this purpose, the second electric machine 16 is powered such that the second drive shaft 18 is accelerated (driving in the second direction of rotation). At a speed that is predetermined and dependent on the second one-way clutch 24 (i.e., when the second drive shaft 18 overtakes the second one-way clutch 24), the second one-way clutch 24 couples the second clutch gearwheel 25 to the second drive shaft 18 so that the second drive shaft 18 drives the second clutch gearwheel 25 and the latter in turn drives the intermediate gearwheel 27.

Because the third gearwheel 32 as well as the intermediate gearwheel 27 are engaged with the fourth gearwheel 34 of the output shaft 20 in a meshing manner, the torques of the first drive shaft 14 and the second drive shaft 18 are transferred to or summed on the output shaft 20 via the fourth gearwheel 34 (third summation gear). The first electric machine 12 and the second electric machine 16 are driven in opposite directions of rotation (counter-rotational movement).

In the second gear, the second electric machine 16 can also be activated in an alternative manner. For this purpose, the second electric machine 16 is powered such that the second drive shaft 18 is accelerated (driving in the first direction of rotation). At a speed that is predetermined and dependent on the first one-way clutch 22 (i.e., when the second drive shaft 18 overtakes the first one-way clutch 22), the first one-way clutch 22 couples the first clutch gearwheel 23 to the second drive shaft 18 so that the second drive shaft 18 drives the first clutch gearwheel 23, and the latter in turn drives the second gearwheel 28 of the drive shaft 20. Because the third gearwheel 32 is in meshing engagement with the fourth gearwheel 34 of the output shaft 20 and the first clutch gearwheel 23 is in meshing engagement with the second gearwheel 28 of the output shaft 20, the torques of the first drive shaft 14 and the second drive shaft 18 are transferred to or summed on the output shaft 20 via the second gearwheel 28 and the fourth gearwheel 34 (fourth summation gear). The first electric machine 12 and the second electric machine 16 are driven in the same directions of rotation (concordant rotational movement).

In a neutral gear, the clutch 30 does not couple the first gearwheel 26 or the third gearwheel 32 to the first drive shaft 14. In other words, in the neutral gear, the first gearwheel 26 and the third gearwheel 32 are rotatably arranged on the first drive shaft 14 and do not transfer any torque to the output shaft 20.

In the example, the drive assembly 10 is configured so as to provide eight gears or switching steps. The eight gears comprise four gears in which only the first electric machine 12 or the second electric machine 16 drive the output shaft 20 as well as four summation gears in which the first electric machine 12 and the second electric machine 16 drive the output shaft 20 together.

In the first gear of the drive assembly 10, the first gearwheel 26 is coupled to the first drive shaft 14 in a rotationally fixed manner by means of the clutch 30 and drives the output shaft 20 via the second gearwheel 28. The first drive shaft 14 is driven by powering the first electric machine 12. The second electric machine 16 is not operated.

If, in addition to the first electric machine 12, the second electric machine 16 is activated, the second electric machine 16 can be activated via the first one-way clutch 22 (first summation gear) or via the second one-way clutch 24 (second summation gear), depending on the direction of rotation of the drive shaft 18. The first and second summation gears have already been described above.

In the second gear of the drive assembly 10, the third gearwheel 32 is coupled to the first drive shaft 14 in a rotationally fixed manner by means of the clutch 30 and drives the output shaft 20 via the fourth gearwheel 34. The first drive shaft 14 is driven by powering the first electric machine 12. The second electric machine 16 is not operated.

If, in addition to the first electric machine 12, the second electric machine 16 is activated, the second electric machine 16 can be activated via the second one-way clutch 24 (third summation gear) or via the first one-way clutch 22 (fourth summation gear), depending on the direction of rotation of the drive shaft 18. The third and fourth summation gears have already been described above.

In the third gear of the drive assembly 10, the second electric machine 16 is powered such that the output shaft 20 is driven by the first one-way clutch 22, the first clutch gearwheel 23, and the second gearwheel 28. The first electric machine 12 is not powered and/or the clutch 30 is in a neutral gear in which the first gearwheel 26 and the third gearwheel 32 are freely rotatable on the output shaft 20.

In the fourth gear of the drive assembly 10, the second electric machine 16 is powered such that the output shaft 20 is driven by the second one-way clutch 24, the second clutch gearwheel 25, the intermediate gearwheel 27, and the fourth gearwheel 34. The first electric machine 12 is not powered and/or the clutch 30 is in a neutral gear in which the first gearwheel 26 and the third gearwheel 32 are freely rotatable on the output shaft 20.

The second electric machine 16 can be deactivated or activated in the first, second, or neutral gear. In addition, a reverse mode of the drive assembly (via the first or the second gear ratio step) can be implemented, in particular, with the first electric machine 16. The first electric machine 16 can also be configured for recuperation, for example during a braking operation of a vehicle (not shown) equipped with the drive assembly 10.

The invention claimed is:

1. A drive assembly (10) comprising
a first electric machine (12) having a first drive shaft (14),
a second electric machine (16) having a second drive shaft (18), and
an output shaft (20),
wherein the first drive shaft (14) and the second drive shaft (18) are coupled or couplable to the output shaft (20) in such a way that the output shaft (20) can be driven by means of the first drive shaft (14) and/or the second drive shaft (18), wherein the second drive shaft (18) comprises a first one-way clutch (22), by which the second drive shaft (18) is coupled or couplable to the output shaft (20), and a second one-way clutch (24), wherein the first one-way clutch (22) and the second one-way clutch (24) are configured so as to act in opposite directions of rotation, wherein, by the second one-way clutch (24) and an intermediate gearwheel (27), the second drive shaft (18) is coupled or couplable to the output shaft (20), and
wherein either the first one-way clutch (22) or the second one-way clutch (24) is engaged depending on a direction of rotation of the second drive shaft (18).

2. The drive assembly (10) according to claim 1, wherein the first drive shaft (14) comprises a first gearwheel (26), and a second gearwheel (28) is arranged in a rotationally fixed manner on the output shaft (20), wherein the first gearwheel (26) is couplable to the first drive shaft (14) in a rotationally fixed manner by a clutch (30), wherein a first gear of the drive assembly (10) is implementable in that the first gearwheel (26) of the first drive shaft (14) drives the second gearwheel (28) of the output shaft (20), wherein the first gearwheel (26) is coupled to the first drive shaft (14) in a rotationally fixed manner by the clutch (30).

3. The drive assembly (10) according to claim 2, wherein, in the first gear of the drive assembly (10), the second electric machine (16) is activatable, in that the second electric machine (16) drives the second gearwheel (28) of the output shaft (20) via the first one-way clutch (22) of the second drive shaft (18) or a fourth gearwheel (34) arranged on the output shaft (20) in a rotationally fixed manner via the second one-way clutch (24) of the second drive shaft (18) via the intermediate gearwheel (27).

4. The drive assembly (10) according to claim 2, wherein the first drive shaft (14) comprises a third gearwheel (32) and a fourth gearwheel (34) is arranged in a rotationally fixed manner on the output shaft (20), wherein the third gearwheel (32) is couplable to the first drive shaft (14) in a rotationally fixed manner by the clutch (30), wherein a second gear of the drive assembly (10) is implementable in that the third gearwheel (32) of the first drive shaft (14) drives the fourth gearwheel (34) of the output shaft (20), wherein the third gearwheel (32) is coupled to the first drive shaft (14) in a rotationally fixed manner by the clutch (30).

5. The drive assembly (10) according to claim 4, wherein, in the second gear of the drive assembly (10), the second electric machine (16) is activatable, in that the second electric machine (16) drives the fourth gearwheel (34) of the output shaft (20) via the second one-way clutch (24) of the second drive shaft (18) and the intermediate gearwheel (27) or the second gearwheel (28) of the output shaft (20) via the first one-way clutch (22) of the second drive shaft (18).

6. The drive assembly (10) according to claim 4, wherein a neutral gear of the drive assembly (10) is implementable in that the first gearwheel (26) and the third gearwheel (32) are freely rotatable on the first drive shaft (14).

7. The drive assembly (10) according to claim 6, wherein the drive assembly (10) comprises a gear adjuster (36), which actuates the clutch (30) in such a way that switching can be done between the first, the second, and the neutral gears.

8. The drive assembly (10) according to claim 6, wherein the second electric machine (16) is activatable and/or deactivatable in the first, second, and neutral gears.

9. The drive assembly (10) according to claim 1, wherein the first electric machine (12) is configured for recuperation and/or in that the drive assembly (10) is configured so as to provide eight gears.

10. A vehicle, having a drive assembly (10) according claim 1.

11. A drive assembly (10) for a vehicle, the drive assembly comprising
a first electric machine (12) having a first drive shaft (14),
a second electric machine (16) having a second drive shaft (18), and
an output shaft (20),
wherein the first drive shaft (14), the second drive shaft (18), and the output shaft (20) are arranged parallel to one another, and
wherein the first drive shaft (14) and the second drive shaft (18) are coupled or couplable to the output shaft (20) in such a way that the output shaft (20) can be driven by means of the first drive shaft (14) and/or the second drive shaft (18), wherein the second drive shaft (18) comprises a first one-way clutch (22), by which the second drive shaft (18) is coupled or couplable to the output shaft (20), and a second one-way clutch (24), wherein the first one-way clutch (22) and the second one-way clutch (24) are configured so as to act in opposite directions of rotation, wherein, by the second one-way clutch (24) and an intermediate gearwheel (27), which serves to reverse the direction of rotation, the second drive shaft (18) is coupled or couplable to the output shaft (20), and wherein either the first one-way clutch (22) or the second one-way clutch (24) is engaged depending on a direction of rotation of the second drive shaft (18).

12. The drive assembly (10) according to claim 11, wherein the first drive shaft (14) comprises a first gearwheel (26), and a second gearwheel (28) is arranged in a rotationally fixed manner on the output shaft (20), wherein the first gearwheel (26) is couplable to the first drive shaft (14) in a rotationally fixed manner by a clutch (30), wherein a first gear of the drive assembly (10) is implementable in that the first gearwheel (26) of the first drive shaft (14) drives the second gearwheel (28) of the output shaft (20), wherein the first gearwheel (26) is coupled to the first drive shaft (14) in a rotationally fixed manner by the clutch (30).

13. The drive assembly (10) according to claim 12, wherein, in the first gear of the drive assembly (10), the second electric machine (16) is activatable, in that the second electric machine (16) drives the second gearwheel (28) of the output shaft (20) via the first one-way clutch (22) of the second drive shaft (18) or a fourth gearwheel (34) arranged on the output shaft (20) in a rotationally fixed manner via the second one-way clutch (24) of the second drive shaft (18) via an intermediate gearwheel (27).

14. The drive assembly (10) according to claim 13, wherein the first drive shaft (14) comprises a third gearwheel (32) and a fourth gearwheel (34) is arranged in a rotationally fixed manner on the output shaft (20), wherein the third gearwheel (32) is couplable to the first drive shaft (14) in a rotationally fixed manner by the clutch (30), wherein a second gear of the drive assembly (10) is implementable in that the third gearwheel (32) of the first drive shaft (14) drives the fourth gearwheel (34) of the output shaft (20), wherein the third gearwheel (32) is coupled to the first drive shaft (14) in a rotationally fixed manner by the clutch (30).

15. The drive assembly (10) according to claim 14, wherein, in the second gear of the drive assembly (10), the second electric machine (16) is activatable, in that the second electric machine (16) drives the fourth gearwheel (34) of the output shaft (20) via the second one-way clutch (24) of the second drive shaft (18) and the intermediate gearwheel (27) or the second gearwheel (28) of the output shaft (20) via the first one-way clutch (22) of the second drive shaft (18).

16. The drive assembly (10) according to claim 15, wherein a neutral gear of the drive assembly (10) is implementable in that the first gearwheel (26) and the third gearwheel (32) are freely rotatable on the first drive shaft (14).

17. The drive assembly (10) according to claim 16, wherein the drive assembly (10) comprises a gear adjuster (36), which actuates the clutch (30) in such a way that switching can be done between the first, the second, and the neutral gears.

18. The drive assembly (10) according to claim 17, wherein the second electric machine (16) is activatable and/or deactivatable in the first, second, and neutral gears, wherein the second electric machine (16) is configured so as to take over the load of the first electric machine (16) during a gear shift.

19. The drive assembly (10) according to claim 18, wherein the first electric machine (12) is configured for recuperation and/or in that the drive assembly (10) is configured so as to provide eight gears.

* * * * *